(12) United States Patent
Deng et al.

(10) Patent No.: US 12,436,587 B2
(45) Date of Patent: Oct. 7, 2025

(54) ELECTRONIC DEVICE INCLUDING POWER SUPPLYING APPARATUS, AND COMPUTING SYSTEM

(71) Applicant: HUAWEI TECHNOLOGIES CO., LTD., Guangdong (CN)

(72) Inventors: Zhigao Deng, Shenzhen (CN); Zao Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 18/490,378

(22) Filed: Oct. 19, 2023

(65) Prior Publication Data
US 2024/0045486 A1   Feb. 8, 2024

Related U.S. Application Data

(63) Continuation of application No. PCT/CN2022/083117, filed on Mar. 25, 2022.

(30) Foreign Application Priority Data

Apr. 23, 2021   (CN) .......................... 202110441668.X

(51) Int. Cl.
G06F 1/26   (2006.01)
G06F 1/18   (2006.01)
H05K 7/14   (2006.01)

(52) U.S. Cl.
CPC ............. *G06F 1/26* (2013.01); *H05K 7/1492* (2013.01); *G06F 1/189* (2013.01)

(58) Field of Classification Search
CPC .......... G06F 1/189; G06F 1/26; H05K 7/1492
See application file for complete search history.

(56) References Cited

U.S. PATENT DOCUMENTS

| | | | | |
|---|---|---|---|---|
| 8,009,438 B2* | 8/2011 | Leigh | ..................... | H05K 1/144 |
| | | | | 361/788 |
| 2007/0141883 A1* | 6/2007 | Bulcea | ................... | H05K 1/144 |
| | | | | 439/215 |
| 2008/0046617 A1* | 2/2008 | Lee | ....................... | G06F 13/409 |
| | | | | 710/104 |
| 2008/0216298 A1* | 9/2008 | Dudnikov | ................ | H05K 1/18 |
| | | | | 29/25.42 |

FOREIGN PATENT DOCUMENTS

| | | |
|---|---|---|
| CN | 103746442 A | 4/2014 |
| CN | 207639004 U | 7/2018 |
| CN | 111065199 A | 4/2020 |
| JP | H05183271 A | 7/1993 |
| JP | 2017049743 A | 3/2017 |

OTHER PUBLICATIONS

Extended European Search Report in European Appln. No. 22790799.5, mailed on Aug. 30, 2024, 7 pages.
International Search Report and Written Opinion in International Appln. No. PCT/CN2022/083117, mailed on May 31, 2022, 17 pages (with English translation).

* cited by examiner

*Primary Examiner* — Terrell S Johnson
(74) *Attorney, Agent, or Firm* — Fish & Richardson P.C.

(57) ABSTRACT

This application provides an electronic device includes the power supplier and a plurality of circuit boards. The power supplier is located below the plurality of circuit boards, each circuit board is connected to the power supplier to obtain power from the power supplier.

14 Claims, 5 Drawing Sheets

ELECTRONIC DEVICE INCLUDING POWER SUPPLYING APPARATUS, AND COMPUTING SYSTEM

CROSS-REFERENCE TO RELATED APPLICATIONS

This application is a continuation of International Patent Application No. PCT/CN2022/083117, filed on Mar. 25, 2022, which claims priority to Chinese Patent Application No. 202110441668.X, filed on Apr. 23, 2021. The disclosures of the aforementioned applications are hereby incorporated by reference in their entireties.

TECHNICAL FIELD

This application relates to the field of computer technologies, and more specifically, to an electronic device including a power supplying apparatus, and a computing system.

BACKGROUND

A printed circuit board (PCB) with an integrated design is generally used as a main circuit board of a conventional server. In the conventional server, the PCB with the integrated design includes functional circuits (for example, an expander circuit, a power source circuit, a storage circuit, a computing circuit, and a switching circuit) and a signal route and a current through-current route between the functional circuits. The current through-current route connects the power source circuit to each functional circuit, to supply power to each functional circuit. Due to the limitation of a space size and costs, the PCB with the integrated design has limited space for the current through-current route, and cannot support a through-current requirement of large current.

SUMMARY

This application provides an electronic device including a power supplying apparatus, and a computing system, to meet a through-current requirement of large current, and reduce circuit board costs caused by through-current routing of a large current.

According to a first aspect, an electronic device is provided. The electronic device includes a power supplying apparatus and a plurality of circuit boards, where the power supplying apparatus is located below the plurality of circuit boards; and the power supplying apparatus is connected to any one or more of the plurality of circuit boards, where the power supplying apparatus is configured to supply power to the any one or more circuit boards connected to the power supplying apparatus.

For example, the electronic device is an electronic device that has a computing capability, such as a server, a switch, a router, or a terminal device.

For example, the power supplying apparatus is a conductive mechanical part that has a through-current capability for large current, such as a copper bar.

Based on the foregoing technical solution, the power supplying apparatus is connected to the circuit board. When the power supplying apparatus supplies power to a circuit board, a current through-current route does not need to pass through another circuit board, and the power supplying apparatus may directly supply power to the circuit board, to meet a through-current requirement of large current and reduce circuit board costs caused by through-current routing of a large current. In addition, the power supplying apparatus is located below each circuit board. Therefore, in addition to implementing a power supplying function, the power supplying apparatus may further serve as a lining board to protect each circuit board and prevent each circuit board from being collided with or damaged. In this way, an independent lining board may be removed, fastening screws of each circuit board are reduced, and costs brought by additionally arranging the lining board are reduced.

With reference to the first aspect, in some implementations of the first aspect, the power supplying apparatus includes a power source power supplying plane structure and a power source ground plane structure.

It may be understood that both the power source power supplying plane structure and the power source ground plane structure are physical structures. For example, both the power source power supplying plane structure and the power source ground plane structure are structures made of metal materials.

With reference to the first aspect, in some implementations of the first aspect, the power source power supplying plane structure is located above the power source ground plane structure, or the power source power supplying plane structure is located below the power source ground plane structure.

Based on the foregoing technical solution, a location relationship between the power source power supplying plane structure and the power source ground plane structure may be an up-down relationship. In addition, when the power source power supplying plane structure is located above the power source ground plane structure, the power supplying apparatus may serve as a lining board to protect each circuit board, so that costs brought by additionally arranging the lining board are reduced.

With reference to the first aspect, in some implementations of the first aspect, the power source power supplying plane structure and the power source ground plane structure are located in a same plane.

Based on the foregoing technical solution, when the power source power supplying plane structure and the power source ground plane structure are in a same plane, a thickness of the power supplying apparatus or even the entire electronic device can be reduced, so that not only costs can be reduced, but also a requirement for miniaturizing, lightening, and thinning the electronic device is more easily met.

With reference to the first aspect, in some implementations of the first aspect, the power source power supplying plane structure and the power source ground plane structure are isolated from each other by an insulation material; or the power source power supplying plane structure and the power source ground plane structure are spatially isolated from each other.

Based on the foregoing technical solution, the power source power supplying plane structure and the power source ground plane structure are isolated from each other, to prevent a power supplying short circuit and a ground short circuit.

With reference to the first aspect, in some implementations of the first aspect, the power supplying apparatus further includes a non-through-current plane structure, and the non-through-current plane structure is isolated from the power source power supplying plane structure and the power source ground plane structure by an insulation material.

With reference to the first aspect, in some implementations of the first aspect, a conductivity of a material used by the non-through-current plane structure is lower than conductivities of materials used by the power source power supplying plane structure and the power source ground plane structure.

For example, in the power supplying apparatus, costs of a material used by the non-through-current plane structure are lower than costs of materials used by the power source power supplying plane structure and the power source ground plane structure.

Based on the foregoing technical solution, the power source power supplying plane structure and the power source ground plane structure use materials with high conductibility, and the non-through-current plane structure may use a material with conductibility that is not high, thereby further reducing material costs.

With reference to the first aspect, in some implementations of the first aspect, the power supplying apparatus being connected to any one or more of the plurality of circuit boards includes: the any one or more circuit boards are connected to the power supplying apparatus through a conductive connecting piece; or a printed circuit board PCB surface layer of the circuit board is in contact with and connected to the power supplying apparatus.

For example, the conductive connecting piece is a copper clip or another type of power source connector.

With reference to the first aspect, in some implementations of the first aspect, a printed circuit board PCB surface layer of the circuit board is in contact with the power supplying apparatus, and the PCB surface layer of the circuit board is fastened to the power supplying apparatus through a fastening apparatus.

For example, the fastening apparatus is a screw.

Based on the foregoing technical solution, the circuit board can better obtain power from the power supplying apparatus.

With reference to the first aspect, in some implementations of the first aspect, projections of the plurality of circuit boards on the power supplying apparatus are within a contour of the power supplying apparatus, to enable the power supplying apparatus to serve as a lining board to protect the plurality of circuit boards.

With reference to the first aspect, in some implementations of the first aspect, a circuit board type of the plurality of circuit boards includes one or more of the following circuit board types: a computing board, an expander board, a fan board, a power interface board, a storage board, a switching board, and a management board.

Based on the foregoing technical solution, the computing board, the expander board, the fan board, the power interface board, the storage board, the switching board, and the management board may be directly connected to the power supplying apparatus, to obtain power from the power supplying apparatus. In other words, the power supplying apparatus can directly supply power to the computing board, the expander board, the fan board, the power interface board, the storage board, the switching board, and the management board. Alternatively, some circuit boards may be connected to the power supplying apparatus and obtain power from the power supplying apparatus, and some circuit boards obtain power from the circuit boards already connected to the power supplying apparatus.

According to a second aspect, a computing system is provided. The computing system includes a subrack, a fan, and the electronic device according to the first aspect.

According to a third aspect, a power supplying apparatus is provided. The power supplying apparatus is the power supplying apparatus according to the first aspect.

DESCRIPTION OF EMBODIMENTS

The following describes technical solutions of this application with reference to accompanying drawings.

Figure 1:
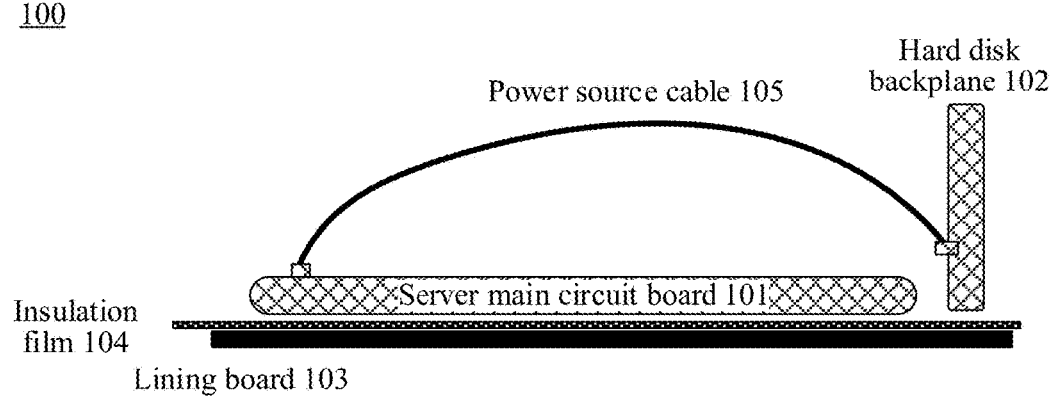
FIG. 1 is a structural diagram of a conventional server.

A printed circuit board (PCB) with an integrated design is generally used as a main circuit board of a conventional server. In an example, FIG. 1 shows a structural diagram of a conventional server 100. As shown in FIG. 1, the conventional server 100 generally includes: a server main circuit board 101, a hard disk backplane 102, a lining board 103, and an insulation film 104.

A PCB with an integrated design is generally used as the server main circuit board 101. The PCB with the integrated design includes functional circuits. For example, the functional circuits may include but are not limited to an expander circuit, a power source circuit, a storage circuit, a computing circuit, a switching circuit, and the like. For example, the computing circuit may also be denoted as a computing unit, and may include but is not limited to a central processing unit (CPU) and a memory. The expander circuit may include but is not limited to an input/output (I/O) unit. For example, the power source circuit may also be denoted as a power supplying unit. The server main circuit board 101 may further include a fan management unit, which may be configured to monitor a fan and supply power to the fan; and a management unit, configured to manage the server.

The hard disk backplane 102 may be used for storage. The hard disk backplane 102 may be connected to the server main circuit board 101 through a cable 105, to implement communication and obtain power. The lining board 103 placed under the server main circuit board 101 mainly plays a protection role, and can protect the server main circuit board 101 from being collided with or damaged.

It should be understood that, in embodiments of this application, it is not limited that the server includes only the foregoing functional circuits. The server may further include another functional circuit. For brevity, details are not described herein again.

In the conventional server 100, the PCB with the integrated design includes a signal route and a current through-current route. The current through-current route connects the power source circuit to each functional circuit, to supply power to each functional circuit. In this design, when the power source circuit supplies power to a functional circuit, the current through-current route needs to pass through the PCB with the integrated design. Therefore, due to a limitation of a space size and costs, the PCB with the integrated design has limited space for the current through-current route, and consequently has difficulty in supporting a through-current requirement of large current. Through-current represents that a current passes through. For example, when a through-current on the PCB with the integrated design exceeds a threshold (for example, 400 amperes (A)), the PCB needs to be thickened (for example, to a 2-ounce (OZ) PCB) to transmit a current. The PCB design is complex, and has many layers. As a result, costs are high, or even the PCB cannot be implemented (for example, the 2-OZ PCB cannot be implemented). In addition, there are many power source connectors, a board design is complex or has many cables, and assembly is complex and has low efficiency.

This application proposes that a power supplying apparatus is connected to a circuit board, and can directly supply power to the circuit board, to meet the through-current requirement of large current, and reduce circuit board costs caused by through-current routing of a large current. In addition to implementing a power supplying function, the power supplying apparatus may further serve as a lining board to protect each circuit board and prevent each circuit board from being collided with or damaged. In this way, an independent lining board may be removed, fastening screws of each circuit board are reduced, and costs brought by additionally arranging the lining board are reduced.

The following describes in detail embodiments of this application with reference to accompanying drawings.

An embodiment of this application provides an electronic device 200. The electronic device 200 includes a power supplying apparatus 202 and a plurality of circuit boards 201. The power supplying apparatus 202 is connected to any one or more of the plurality of circuit boards 201. The power supplying apparatus 202 is configured to supply power to the any one or more circuit boards 201 connected to the power supplying apparatus 202.

Figure 2:
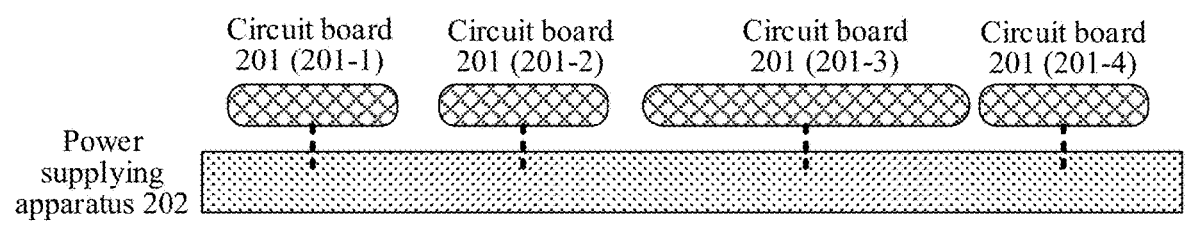
FIG. 2 is a schematic diagram of an electronic device according to an embodiment of this application.

For example, FIG. 2 is a schematic diagram of the electronic device 200 according to an embodiment of this application. As shown in FIG. 2, four circuit boards 201 are used as an example, and are respectively denoted as a circuit board (201-1), a circuit board (201-2), a circuit board (201-3), and a circuit board (201-4). Each circuit board 201 may be directly connected to a power supplying apparatus 202, so that the power supplying apparatus 202 can directly supply power to each circuit board 201.

It should be understood that shapes of the power supplying apparatus 202 and the circuit board 201 shown in FIG. 2 are merely examples, and the shapes are not limited.

It should be further understood that FIG. 2 is merely an example for description, and this is not limited. Any transformed structure based on FIG. 2 falls within the protection scope of embodiments of this application. In an example, the power supplying apparatus 202 may include a plurality of power supplying modules, and each power supplying module is responsible for supplying power to one or more circuit boards 201. In another example, the electronic device 200 may include more circuit boards 201, or may include fewer circuit boards 201.

According to this embodiment of this application, the circuit board 201 and the power supplying apparatus 202 are located on different planes, a service plane is separated from a power supplying plane, and the circuit board 201 may be directly connected to the power supplying apparatus 202. Therefore, the power supplying apparatus 202 can directly supply power to each circuit board 201, to more easily meet a power supplying requirement. In addition, the power supplying apparatus 202 may be located below each circuit board 201, and the power supplying apparatus 202 serves as a lining board, so that costs brought by additionally arranging the lining board are reduced.

For example, the electronic device 200 may also be referred to as an electronic hardware device. A form of the electronic device 200 is not limited in this embodiment of this application. For example, the electronic device 200 may be a server, or may be an electronic device that has a computing capability, such as a switch, a router, or a terminal device. It should be understood that any electronic device that includes at least the circuit board 201 and the power supplying apparatus 202 is applicable to this embodiment of this application.

For example, the circuit board 201 may also be referred to as a board, a function board, a module, or a unit.

In a possible implementation, a type of the circuit board 201 may include one or more of the following: a computing board, an expander board, a fan board, a power interface board, a storage board, a switching board, and a management board. It should be understood that the "type" described herein refers to division performed in terms of functions. By way of example, and not limitation, for example, the computing board includes a CPU, a memory controller, a memory module, and the like, and may be configured to process data, and the like. For another example, the storage board may include various data interfaces that are needed, specific storage space, and a storage array management function, and provide data storage, management, query, and the like. For another example, the expander board may mainly include an accessory with a specific function, such as a video card, an encoder, or a decoder. For another example, the fan board is configured to monitor a fan, supply power to the fan, and the like. It should be understood that the foregoing is merely an example for description. For a specific function of each circuit board 201, refer to a conventional technology. This is not limited herein.

In an example, the plurality of circuit boards 201 may include a same type of circuit board 201, and include a plurality of circuit boards 201 of this type. For example, the plurality of circuit boards 201 include a plurality of computing boards. For another example, the plurality of circuit boards 201 include a plurality of expander boards. For another example, the plurality of circuit boards 201 include a plurality of fan boards. For another example, the plurality of circuit boards 201 include a plurality of power interface boards. For another example, the plurality of circuit boards 201 include a plurality of storage boards. For another example, the plurality of circuit boards 201 include a plurality of switching boards. For another example, the plurality of circuit boards 201 include a plurality of management boards.

In another example, the plurality of circuit boards 201 may include a plurality of types of circuit boards 201, and there may be one or more circuit boards 201 of each type. For example, the plurality of circuit boards 201 include one or more computing boards and one or more expander boards. For another example, the plurality of circuit boards 201 include one or more computing boards and one or more storage boards. For another example, the plurality of circuit boards 201 include one or more expander boards, one or more switching boards, and the like.

Based on this implementation, the computing board, the expander board, the fan board, the power interface board, the storage board, the switching board, and the management board are all connected to the integrated power supplying apparatus 202, and the computing board, the expander board, the fan board, the power interface board, the storage board, the switching board, and the management board can all directly obtain power from the power supplying apparatus 202.

FIG. 2 is used as an example. For example, the four circuit boards 201 may be a computing board, an expander board, a fan board, and a storage board. In other words, the computing board, the expander board, the fan board, and the storage board may be directly connected to the power supplying apparatus 202, and the power supplying apparatus 202 can directly supply power to the computing board, the expander board, the fan board, and the storage board.

It should be understood that the plurality of circuit boards 201 are not strictly limited. For example, the plurality of circuit boards 201 may further include a hard disk backplane 102. For another example, the plurality of circuit boards 201 may be all different; or the plurality of circuit boards 201 may be partially the same and partially different; or the plurality of circuit boards 201 may be all the same.

It should be further understood that, the plurality of circuit boards 201 may be directly connected to the power supplying apparatus 202, to obtain power from the power supplying apparatus 202; or some circuit boards 201 may be connected to the power supplying apparatus 202, and obtain power from the power supplying apparatus 202, and some circuit boards 201 may obtain power from the circuit boards 201 already connected to the power supplying apparatus 202.

The power supplying apparatus 202 and the circuit board 201 may be disposed in a manner of being isolated from each other. For example, the power supplying apparatus 202 and the circuit board 201 are isolated from each other by an insulation material 203 (in other words, an insulation layer, an insulation plane, or an insulation structure); or the power supplying apparatus 202 and the circuit board 201 are spatially isolated from each other. The insulation material 203 may be a physical structure made of an insulation material (for example, an insulation material of a special texture).

Projections of the plurality of circuit boards 201 on the power supplying apparatus 202 are within a contour of the power supplying apparatus 202, to enable the power supplying apparatus 202 to serve as a lining board to protect the plurality of circuit boards 201, and prevent each circuit board 201 from being collided with or damaged. As shown in FIG. 2, projections of the four circuit boards 201 on the power supplying apparatus 202 are within the contour of the power supplying apparatus 202. In this way, the power supplying apparatus 202 can protect the four circuit boards 201.

The power supplying apparatus 202 may be a conductive mechanical part that has a through-current capability for large current. In a possible implementation, the power supplying apparatus 202 is a copper bar. In this embodiment of this application, for example, the copper bar may also be denoted as a power supplying copper bar.

Figure 3:
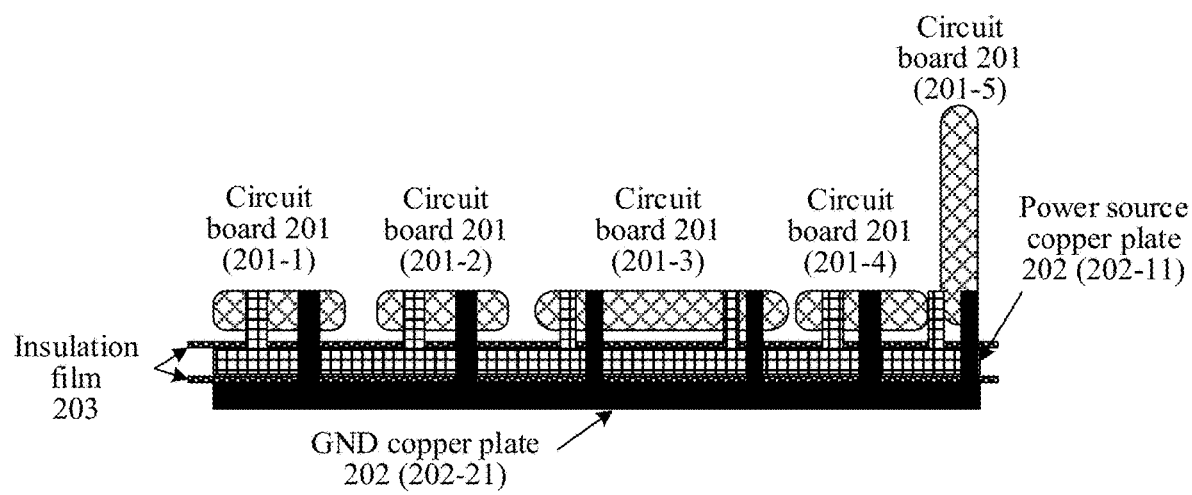
FIG. 3 is a schematic diagram of an electronic device whose power supplying apparatus is a copper bar according to an embodiment of this application.

For example, FIG. 3 is a schematic diagram of an electronic device 200 whose power supplying apparatus 202 is a copper bar according to an embodiment of this application.

As shown in FIG. 3, circuit boards 201, such as a computing board, an expander board, a fan board, a power interface board, a storage board, a switching board, and a management board, are connected to the copper bar, and each circuit board 201 can obtain power from the copper bar, in other words, the copper bar can supply power to each circuit board 201. For example, the circuit boards 201 are respectively denoted as a circuit board (201-1), a circuit board (201-2), a circuit board (201-3), a circuit board (201-4), and a circuit board (201-5).

As shown in FIG. 3, the copper bar may be located below the circuit boards 201. An integrated copper bar is placed in lining board space below a main circuit board in a conventional server. The circuit boards 201 (such as the computing board, the expander board, the fan board, the power interface board, the storage board, the switching board, and the management board) can directly obtain power from the copper bar below, to meet a power supplying requirement.

It should be understood that a main material of the power supplying apparatus 202 may be a copper material, or may be another material, for example, an iron material. This is not limited. Any material that can implement electricity conduction is applicable to this embodiment of this application.

In a possible implementation, the power supplying apparatus 202 includes a power source power supplying plane structure (202-1) and a power source ground plane structure (202-2).

The power source power supplying plane structure (202-1) may also be denoted as a power source plane, a power source layer, or a power source film. The power source ground plane structure (202-2) may also be denoted as a ground point (GND) plane, a power source ground layer (in other words, a GND layer), or a power source ground film (or a GND film). It may be understood that both the power source power supplying plane structure (202-1) and the power source ground plane structure (202-2) are physical structures. For example, both the power source power supplying plane structure (202-1) and the power source ground plane structure (202-2) are structures made of conductive materials. On the power source power supplying plane structure (202-1), when the electronic device 200 works, a voltage is a non-GND voltage. On the power source ground plane structure (202-2), when the electronic device 200 works, a voltage is a GND voltage. Therefore, there is a voltage difference between the power source power supplying plane structure (202-1) and the power source ground plane structure (202-2), to supply power to the circuit boards 201. It should be understood that the power source power supplying plane structure (202-1) and the power source ground plane structure (202-2) are names for differentiation, and specific names thereof do not limit the protection scope of embodiments of this application.

A structure shown in FIG. 3 is used as an example for description. As shown in FIG. 3, the copper bar includes a power source copper plate (202-11) and a GND copper plate (202-21). The power source copper board (202-11) may support power source voltages of different values, for example, may support a power source voltage of 12 volts (V), 48 V, 220 V, −12 V, −48 V, −220 V, or the like. Examples are not enumerated. The power source copper plate (202-11) is a physical structure, and represents an example structure of the power source power supplying plane structure (202-1). The GND copper plate (202-21) is a physical structure, represents an example structure of the power source ground plane structure (202-2), and is connected to the GND, and a voltage is a GND voltage.

A location relationship between the power source power supplying plane structure (202-1) and the power source ground plane structure (202-2) is not strictly limited.

In a possible relationship, a location relationship between the power source power supplying plane structure (202-1) and the power source ground plane structure (202-2) is an up-down relationship.

Example 1: The power source power supplying plane structure (202-1) is located above the power source ground plane structure (202-2).

Figure 4:
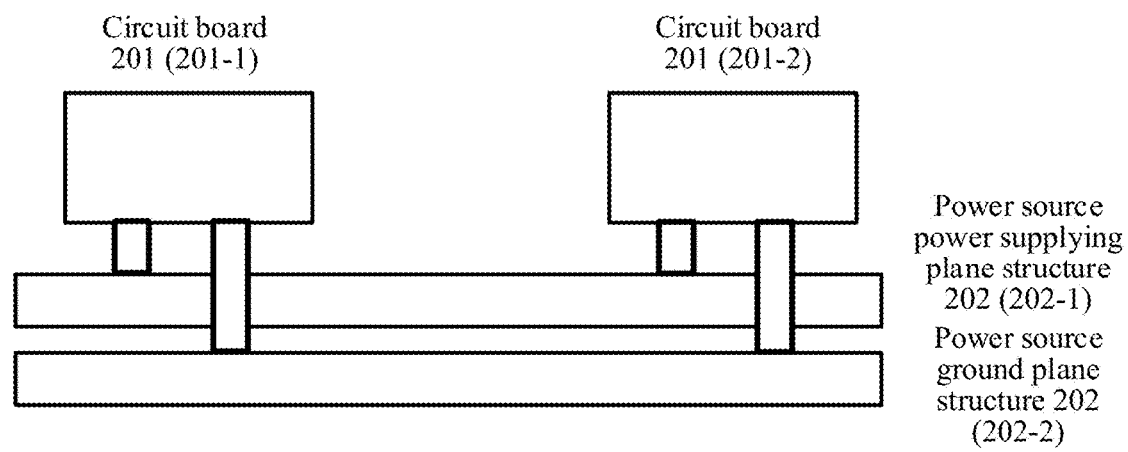
FIG. 4 is a schematic diagram in which a power source power supplying plane structure is located above a power source ground plane structure according to an embodiment of this application.

For example, in an example, FIG. 4 is a schematic diagram in which the power source power supplying plane structure (202-1) is located above the power source ground plane structure (202-2) according to an embodiment of this application. As shown in FIG. 4, the power source power supplying plane structure (202-1) is located above the power source ground plane structure (202-2). As shown in FIG. 4, a current may flow from the power source power supplying plane structure (202-1) to the circuit board 201, and then flow from the circuit board 201 to the power source ground plane structure (202-2).

For another example, an example in which the power supplying apparatus 202 is a copper bar is used, as shown in FIG. 3. The power source power supplying plane structure (202-1) is located above the power source ground plane structure (202-2), in other words, the power source copper plate (202-11) may be located above the GND copper plate (202-21). In this case, the power source copper plate (202-11) and the GND copper plate (202-21) may also function as a lining board.

In this manner, the power supplying apparatus 202 may function as the lining board, the independent lining board is removed, fastening screws of each circuit board 201 are reduced, and costs brought by additionally arranging the lining board are reduced.

Example 2: The power source power supplying plane structure (202-1) is located below the power source ground plane structure (202-2).

Figure 5:
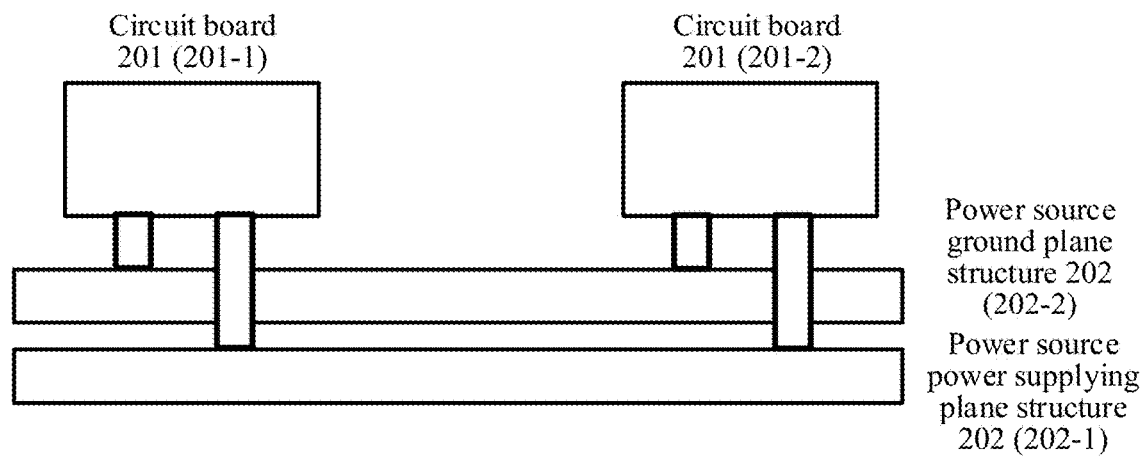
FIG. 5 is a schematic diagram in which a power source power supplying plane structure is located below a power source ground plane structure according to an embodiment of this application.

In an example, FIG. 5 is a schematic diagram in which the power source power supplying plane structure (202-1) is located below the power source ground plane structure (202-2) according to an embodiment of this application. As shown in FIG. 5, the power source power supplying plane structure (202-1) is located below the power source ground plane structure (202-2). As shown in FIG. 5, a current may flow from the power source power supplying plane structure (202-1) to the circuit board 201, and then flow from the circuit board 201 to the power source ground plane structure (202-2).

Figure 6:
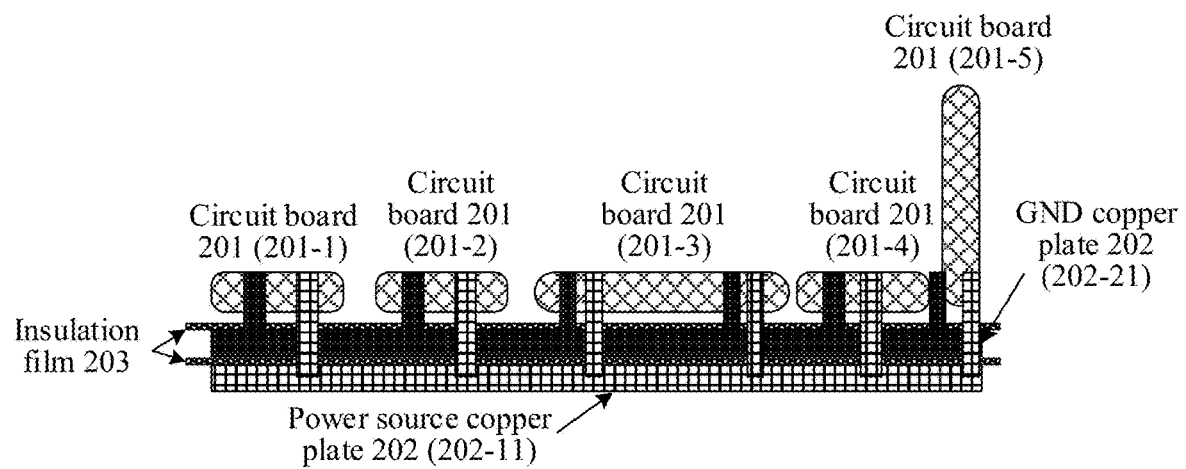
FIG. 6 is a schematic diagram of a location of an insulation layer in a power supplying apparatus according to an embodiment of this application.

For another example, an example in which the power supplying apparatus 202 is a copper bar is used, as shown in FIG. 6. The power source power supplying plane structure (202-1) is located below the power source ground plane structure (202-2), in other words, the power source copper plate (202-11) is located below the GND copper plate (202-21).

The foregoing two examples are merely examples for description. When a location relationship between the power source power supplying plane structure (202-1) and the power source ground plane structure (202-2) is an up-down relationship, the power supplying apparatus 202 is not limited to structures in FIG. 3 to FIG. 6.

In addition, the power source power supplying plane structure (202-1) and the power source ground plane structure (202-2) may be further isolated from each other by an insulation material, or may be spatially isolated from each other. FIG. 3 or FIG. 6 is used as an example. The insulation material 203 may be configured to isolate the power source power supplying plane structure (202-1) and the power source ground plane structure (202-2) from each other, and the insulation material 203 may be further configured to isolate the power supplying apparatus 202 from the circuit boards 201 (such as the computing board, the expander board, the fan board, the power interface board, the storage board, the switching board, and the management board).

It should be understood that "up" and "down" are relative. For example, if the power source power supplying plane structure (202-1) is located above the power source ground plane structure (202-2), it represents that the power source power supplying plane structure (202-1) is located above or at a higher location relative to the power source ground plane structure (202-2), or the power source ground plane structure (202-2) is located below or at a lower location relative to the power source power supplying plane structure (202-1).

In another possible relationship, a location relationship between the power source power supplying plane structure (202-1) and the power source ground plane structure (202-2) is in a same plane. In other words, the power source power supplying plane structure (202-1) and the power source ground plane structure (202-2) may be located in a same plane, in other words, the power source power supplying plane structure (202-1) and the power source ground plane structure (202-2) are in a same plane.

Figure 7:
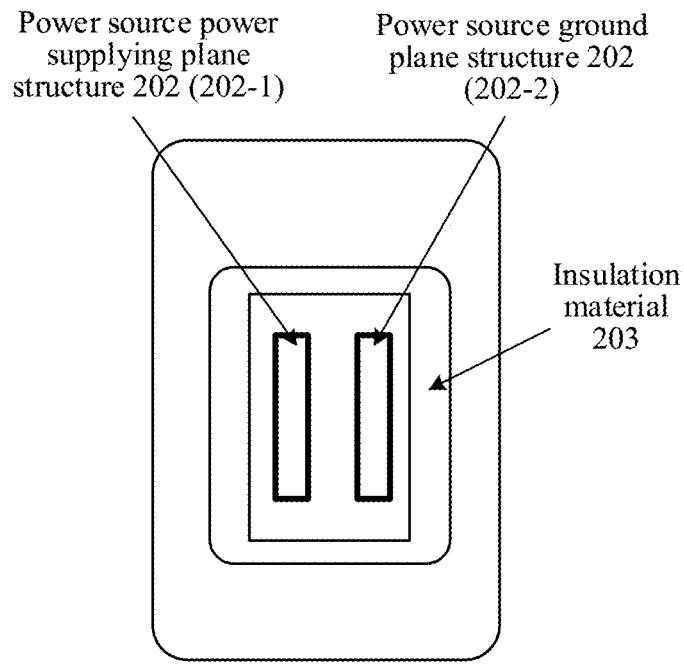
FIG. 7 is a schematic top view in which a power source power supplying plane and a power source ground plane are in a same plane according to an embodiment of this application.

For example, FIG. 7 is a schematic top view in which the power source power supplying plane structure (202-1) and the power source ground plane structure (202-2) are in a same plane according to an embodiment of this application. As shown in FIG. 7, the power source power supplying plane structure (202-1) and the power source ground plane structure (202-2) are located in the same plane. The power source power supplying plane structure (202-1) and the power source ground plane structure (202-2) may be isolated from each other by the insulation material 203, or may be spatially isolated from each other.

When the power source power supplying plane structure (202-1) and the power source ground plane structure (202-2) are in the same plane, a protection structure may be further placed below the power supplying apparatus 202, to implement further protection.

When the power source power supplying plane structure (202-1) and the power source ground plane structure (202-2) are in a same plane, a thickness of the power supplying apparatus 202 or even the entire electronic device can be reduced, so that not only costs can be reduced, but also a requirement for miniaturizing, lightening, and thinning the electronic device is more easily met.

A material of the power supplying apparatus 202 is not limited. For example, the power source power supplying plane structure (202-1) and the power source ground plane structure (202-2) in the power supplying apparatus 202 may use a same metal material, or may use different metal materials. For another example, in an embodiment, the power supplying apparatus 202 includes a through-current plane structure (202-4) and a non-through-current plane structure (202-3), and may use a same metal material, or may use different metal materials. The following mainly describes a case in which the through-current plane structure (202-4) and the non-through-current plane structure (202-3) use different metal materials.

The through-current plane structure (202-4) represents a through-current area of a current (or an area through which the current passes), for example, the power source power supplying plane structure (202-1) and the power source ground plane structure (202-2) in the power supplying apparatus 202 in FIG. 3 to FIG. 6. The non-through-current plane structure (202-3) represents a non-through-current area of the current. The through-current plane structure (202-4) and the non-through-current plane structure (202-3) are isolated from each other by an insulation material, or may be spatially isolated from each other. Both the through-current plane structure (202-4) and the non-through-current plane structure (202-3) are physical structures made of conductive materials. It should be understood that the through-current plane structure (202-4) and the non-through-current plane structure (202-3) are names for differentiation, and specific names thereof do not limit the protection scope of embodiments of this application. The power supplying apparatus 202 includes the power source power supplying plane structure (202-1), the power source ground plane structure (202-2), and the non-through-current plane structure (202-3). The through-current plane structure (202-4) includes the power source power supplying plane structure (202-1) and the power source ground plane structure (202-2). In the following, for brevity, the through-current plane structure (202-4) is used for description.

The following describes two possible designs of materials used by the through-current plane structure (202-4) and the non-through-current plane structure (202-3).

In a possible design, a conductivity of the material used by the non-through-current plane structure (202-3) (namely, the non-through-current area of the current) in the power supplying apparatus 202 is lower than a conductivity of the material used by the through-current plane structure (202-4) (namely, the through-current area of the current) in the power supplying apparatus 202. In an example, the material used by the through-current plane structure (202-4) includes copper, and the material used by the non-through-current plane structure (202-3) may include, for example, iron.

Figure 8:
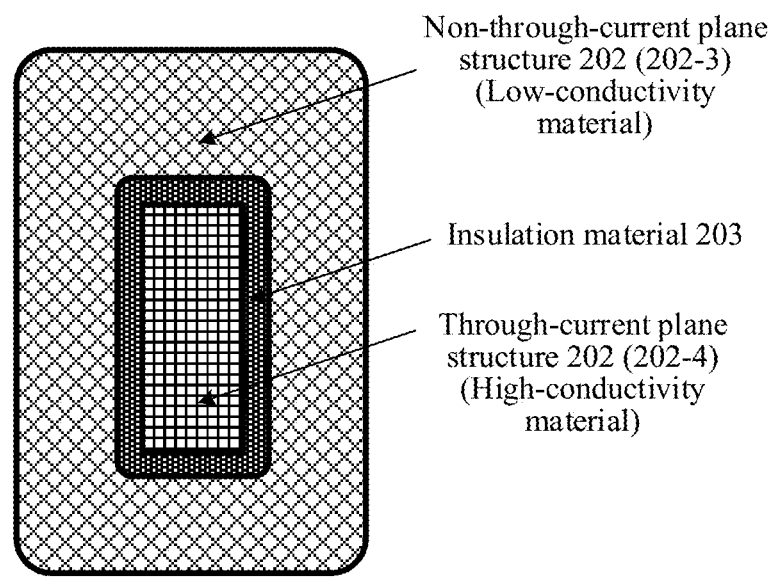
FIG. 8 is a top view of a through-current plane structure and a non-through-current plane structure according to an embodiment of this application.

In an example, FIG. 8 is a top view of the through-current plane structure (202-4) and the non-through-current plane structure (202-3). As shown in FIG. 8, the through-current plane structure (202-4) (namely, the through-current area of the current) may use a high-conductivity material, and the non-through-current plane structure (202-3) (namely, the non-through-current area of the current) may use a low-conductivity material. The through-current plane structure (202-4) and the non-through-current plane structure (202-3) are isolated from each other by the insulation material 203, or may be spatially isolated from each other.

It should be understood that FIG. 8 is merely an example provided to reflect that the through-current plane structure (202-4) and the non-through-current plane structure (202-3) use different metal materials, and does not reflect the power source power supplying plane structure (202-1) and the power source ground plane structure (202-2). For the power source power supplying plane structure (202-1) and the power source ground plane structure (202-2) and a location relationship between the power source power supplying plane structure (202-1) and the power source ground plane structure (202-2), refer to the foregoing descriptions.

Based on this manner, the material used by the through-current plane structure (202-4) (namely, the through-current area of the current) in the power supplying apparatus 202 has high conductibility, and a requirement on conductibility of the material used by the non-through-current plane structure (202-3) (namely, the non-through-current area of the current) in the power supplying apparatus 202 is not high. Therefore, the through-current plane structure (202-4) uses the material with high conductibility, and the non-through-current plane structure (202-3) may use the material with conductibility that is not high, ensuring current flowing through the through-current area, and further reducing material costs.

In another possible design, the through-current plane structure (202-4) (namely, the through-current area of the current) may use a high-conductivity material, and the non-through-current plane structure (202-3) (namely, the non-through-current area of the current) may be left blank. For example, the through-current area of the current may be implemented by using an all-copper design (to be specific, the material of the through-current plane structure (202-4) is all copper), and the non-through-current plane structure is left blank. The non-through-current plane structure (202-3) (namely, the non-through-current area of the current) shown in FIG. 8 may be left blank.

Based on this manner, costs of the power supplying apparatus 202 may be further reduced by using the design in which the area that does not need through-current is left blank.

The foregoing two designs are merely examples for description, and this is not limited. For example, from a perspective of material costs, costs of the material used by the non-through-current plane structure (202-3) (namely, the non-through-current area of the current) in the power supplying apparatus 202 may be lower than costs of the material used by the through-current plane structure (202-4) (namely, the through-current area of the current) in the power supplying apparatus 202, ensuring through-current performance, and further reducing the costs of the power supplying apparatus 202.

A connection manner between the power supplying apparatus 202 and the circuit board 201 is not strictly limited. Any manner in which the circuit board 201 can obtain power from the power supplying apparatus 202 is applicable to embodiments of this application. Two possible manners are provided below.

Manner 1: The circuit board 201 is connected to the power supplying apparatus 202 through a conductive connecting piece.

It should be understood that a specific form of the connecting piece is not limited. For example, the connecting piece is a conductive clip, in other words, the circuit board 201 is connected to the power supplying apparatus 202 through the conductive clip. For example, the conductive connecting piece may be a copper clip or another type of power source connector. An example in which the power supplying apparatus 202 is a copper bar is used. For example, the circuit board 201 may be connected to the power supplying apparatus 202 through a copper clip 205.

Figure 9:
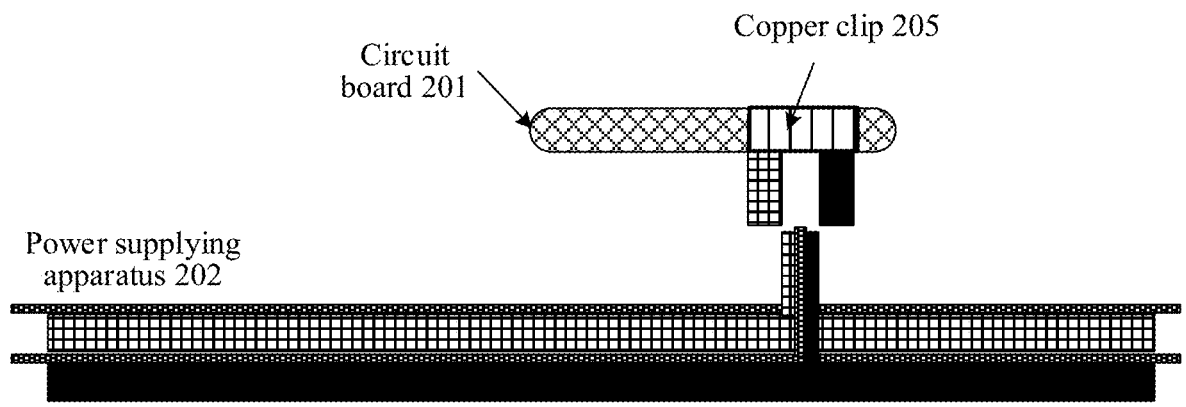
FIG. 9 is a schematic diagram in which a circuit board is connected to a power supplying apparatus through a copper clip according to an embodiment of this application.

In an example, FIG. 9 is a schematic diagram in which the circuit board 201 is connected to the power supplying apparatus 202 through the copper clip 205 according to an embodiment of this application. As shown in FIG. 9, the copper clip 205 is in direct contact with the power supplying apparatus 202, so that the circuit board 201 (such as the computing board, the expander board, the fan board, the power interface board, the storage board, the switching board, or the management board) can directly obtain power from the power supplying apparatus 202 nearby.

It should be understood that FIG. 9 is merely an example for description. Any transformed structure belonging to FIG. 9 falls within the protection scope of embodiments of this application. For example, one circuit board 201 may be connected to the power supplying apparatus 202 through a plurality of copper clips 205. As shown in FIG. 3 or FIG. 6, some circuit boards 201 each are connected to the power supplying apparatus 202 through two copper clips 205. For another example, the copper clip 205 may alternatively be replaced with another conductive clip.

Based on the manner 1, the circuit board 201 is connected to the power supplying apparatus 202 through the connecting piece, so that the circuit board 201 can obtain power from the power supplying apparatus 202.

Manner 2: A PCB surface layer of the circuit board 201 is in contact with the power supplying apparatus 202.

For example, the PCB surface layer of the circuit board 201 may also be fastened to the power supplying apparatus 202 through a fastening apparatus, so that the circuit board 201 can better obtain power from the power supplying apparatus 202. A specific form of the fastening apparatus is not limited. For example, the fastening apparatus may be a screw. An example in which the power supplying apparatus 202 is a copper bar is used. PCB surface layer bright copper plating of the circuit board 201 is in contact with the copper bar.

Figure 10:
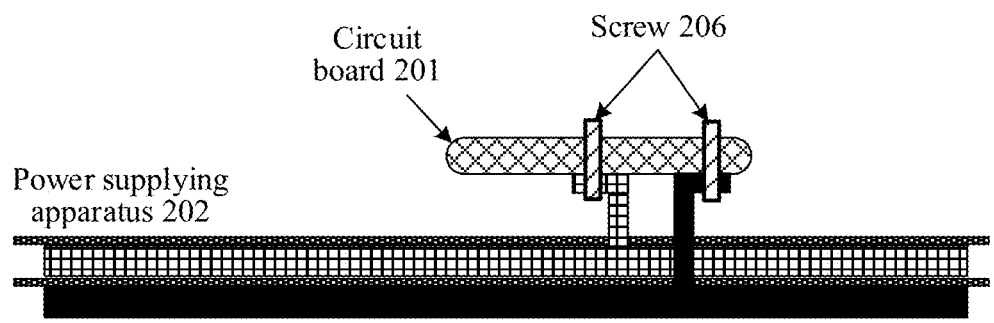
FIG. 10 is a schematic diagram in which PCB surface layer bright copper plating of a circuit board is in contact with and is fastened through screws to a power supplying apparatus according to an embodiment of this application.

In an example, FIG. 10 is a schematic diagram in which the PCB surface layer bright copper plating of the circuit board 201 is in contact with and is fastened through screws 206 to the power supplying apparatus 202 according to an embodiment of this application. As shown in FIG. 10, the power supplying apparatus 202 is in contact with and is fastened through the screws 206 to the PCB surface layer bright copper plating, so that the circuit board 201 (such as the computing board, the expander board, the fan board, the power interface board, the storage board, the switching board, or the management board) can directly obtain power from the power supplying apparatus 202 nearby.

It should be understood that FIG. 10 is merely an example for description. Any transformed structure belonging to FIG. 10 falls within the protection scope of embodiments of this application. For example, one circuit board 201 may be fastened to the power supplying apparatus 202 through the plurality of screws 206. For another example, the screw 206 may be replaced with another component that can implement fastening.

Based on the manner 2, the PCB surface layer of the circuit board 201 is in contact with the power supplying apparatus 202, so that the circuit board 201 can obtain power from the power supplying apparatus 202.

The foregoing enumerates the two manners as examples. It should be understood that any manner in which the circuit board 201 can obtain power from the power supplying apparatus 202 is applicable to embodiments of this application.

It should be understood that in some of the foregoing embodiments, FIG. 2 to FIG. 10 enumerate some specific structures, which are merely examples for description. This is not limited. Any variation of the structures shown in FIG. 2 to FIG. 10 falls within the protection scope of embodiments of this application. For example, the power supplying apparatus may be in a shape shown in FIG. 2 to FIG. 10, or may be in another shape.

It should be further understood that in some of the foregoing embodiments, the computing board, the expander board, the fan board, the power interface board, the storage board, the switching board, the management board, and the like are mainly used as examples for description. This is not limited. Any circuit board in the electronic device may obtain power in the manners shown in FIG. 2 to FIG. 10.

It should be further understood that embodiments of this application may be applicable to a general-purpose server, a Tianchi architecture, or the like. In an example, the electronic device in the foregoing embodiments may be replaced with a server.

It should be further understood that in some of the foregoing embodiments, an example in which the power source power supplying plane structure and the power source ground plane structure are of an up-down relationship or are in a same plane is mainly used for description. This is not limited. Any solution in which the circuit board can obtain power from the power supplying apparatus is applicable to embodiments of this application.

It should be further understood that, in some of the foregoing embodiments, an example in which the power supplying apparatus includes the copper material and/or the iron material is mainly used for description. This is not limited.

It should be further understood that in some of the foregoing embodiments, an orientation or location relationship indicated by terms "up", "down", and the like is based on an orientation or location relationship shown in the accompanying drawings, is merely for ease of describing embodiments of this application, and is a simplified description, instead of indicating or implying that an indicated apparatus or element needs to have a specific orientation, and be constructed and operated in a specific orientation; and therefore, cannot be understood as a limitation on this application.

It should be further understood that in embodiments of this application, unless otherwise expressly specified and limited, terms such as "mount", "interconnect", and "connect" should be understood in a broad sense. For example, the terms may indicate a fixed connection, a detachable connection, or an integral connection; may indicate a mechanical connection or a circuit connection; or may indicate direct interconnection, indirect interconnection through an intermediate medium, or communication between interiors of two elements. For a person of ordinary skill in the art, specific meanings of the foregoing terms in embodiments of this application may be understood based on a specific situation.

Embodiments described in this specification may be independent solutions, or may be combined based on internal logic. All these solutions fall within the protection scope of this application.

Figure 11:
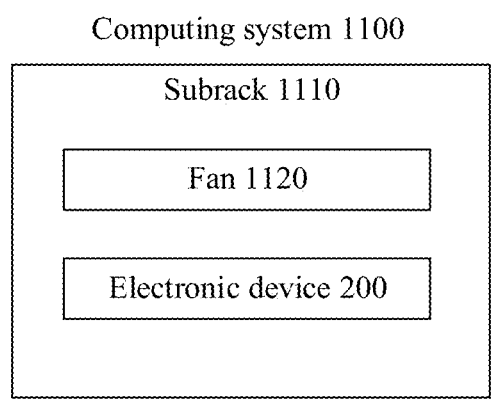
FIG. 11 is a schematic block diagram of a computing system according to an embodiment of this application.

An embodiment of this application further provides a computing system. In an example, FIG. 11 is a schematic block diagram of a computing system 1100 according to an embodiment of this application. As shown in FIG. 11, the computing system 1100 includes a subrack 1110, a fan 1120, and at least one electronic device 200. The electronic device 200 is the electronic device 200 described above.

It should be understood that FIG. 11 is merely an example for description, and this is not limited. For example, the computing system 1100 may further include another device or apparatus.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
a power supplier and a plurality of circuit boards, wherein the power supplier is located below the plurality of circuit boards; and
the power supplier is connected to one or more of the plurality of circuit boards, wherein the power supplier is configured to supply power to the one or more circuit boards connected to the power supplier, and wherein the power supplier and the plurality of circuit boards are isolated from each other by a same insulation layer, and wherein the power supplier is configured to be a lining board for the plurality of circuit boards.

2. The electronic device according to claim 1, wherein the power supplier comprises a power source power supplying plane structure and a power source ground plane structure.

3. The electronic device according to claim 2, wherein
the power source power supplying plane structure is located above the power source ground plane structure, or the power source power supplying plane structure is located below the power source ground plane structure; or
the power source power supplying plane structure and the power source ground plane structure are located in a same plane.

4. The electronic device according to claim 2, wherein
the power supplier further comprises a non-through-current plane structure, and the non-through-current plane structure is isolated from the power source power supplying plane structure and the power source ground plane structure by an insulation material.

5. The electronic device according to claim 4, wherein a conductivity of a material used by the non-through-current plane structure is lower than conductivities of materials used by the power source power supplying plane structure and the power source ground plane structure.

6. The electronic device according to claim 1, wherein the power supplier being connected to one or more of the plurality of circuit boards comprises:
the one or more circuit boards are connected to the power supplier through a conductive connecting piece; or
a printed circuit board (PCB) surface layer of the one or more circuit boards is in contact with and connected to the power supplier.

7. The electronic device according to claim 1 wherein a circuit board type of the plurality of circuit boards comprises one or more of the following circuit board types: a computing board, an expander board, a fan board, a power interface board, a storage board, a switching board, or a management board.

8. A computing system, wherein the computing system comprises a subrack, a fan, and at least one electronic device wherein each of the at least one electronic device comprises:
a power supplier and a plurality of circuit boards, wherein the power supplier is located below the plurality of circuit boards; and
the power supplier is connected to one or more of the plurality of circuit boards, wherein the power supplier is configured to supply power to the one or more circuit boards connected to the power supplier, and wherein the power supplier and the plurality of circuit boards are isolated from each other by a same insulation layer, and wherein the power supplier is configured to be a lining board for the plurality of circuit boards.

9. The computing system of claim 8, wherein the power supplier comprises a power source power supplying plane structure and a power source ground plane structure.

10. The computing system of claim 9, wherein
the power source power supplying plane structure is located above the power source ground plane structure, or the power source power supplying plane structure is located below the power source ground plane structure; or
the power source power supplying plane structure and the power source ground plane structure are located in a same plane.

11. The computing system of claim 9, wherein
the power supplier further comprises a non-through-current plane structure, and the non-through-current plane structure is isolated from the power source power supplying plane structure and the power source ground plane structure by an insulation material.

12. The computing system of claim 11, wherein a conductivity of a material used by the non-through-current plane structure is lower than conductivities of materials used by the power source power supplying plane structure and the power source ground plane structure.

13. The computing system of claim 8, wherein the power supplier being connected to one or more of the plurality of circuit boards comprises:
the one or more circuit boards are connected to the power supplier through a conductive connecting piece; or
a printed circuit board (PCB) surface layer of the one or more circuit boards is in contact with and connected to the power supplier.

14. The computing system of claim 8, wherein a circuit board type of the plurality of circuit boards comprises one or more of the following circuit board types: a computing board, an expander board, a fan board, a power interface board, a storage board, a switching board, or a management board.

* * * * *